United States Patent
Van den Heever et al.

(10) Patent No.: US 11,276,122 B2
(45) Date of Patent: Mar. 15, 2022

(54) PAYROLL POLICY MINER

(71) Applicant: ADP, LLC, Roseland, NJ (US)

(72) Inventors: Walter Jacobus Van den Heever, Longmont, CO (US); Dimitry Plotko, Alpharetta, GA (US); Brian Christian Jones, Las Vegas, NV (US)

(73) Assignee: ADP, LLC, Roseland, NJ (US)

( * ) Notice: Subject to any disclaimer, the term of this patent is extended or adjusted under 35 U.S.C. 154(b) by 287 days.

(21) Appl. No.: 15/702,535

(22) Filed: Sep. 12, 2017

(65) Prior Publication Data
US 2019/0080418 A1 Mar. 14, 2019

(51) Int. Cl.
*G06Q 40/00* (2012.01)

(52) U.S. Cl.
CPC .................... *G06Q 40/12* (2013.12)

(58) Field of Classification Search
USPC ...................................... 705/30, 32
See application file for complete search history.

(56) References Cited

U.S. PATENT DOCUMENTS

| | | | |
|---|---|---|---|
| 2006/0241961 A1 | 10/2006 | Tsyganskiy et al. | |
| 2006/0242197 A1 | 10/2006 | Tsyganskiy et al. | |
| 2006/0242207 A1* | 10/2006 | Tsyganskiy | ............... G06F 8/72 |
| 2014/0358748 A1* | 12/2014 | Goyette | ............... G06Q 30/018 |
| | | | 705/32 |

OTHER PUBLICATIONS

Bloom, "The Future of HRM Software: Interrogatory Configuration," In Full Bloom, Dec. 7, 2009, 3 pages, http://infullbloom.us/589/the-future-of-hrm-software-interrogatory-configuration/.

* cited by examiner

*Primary Examiner* — Peter Ludwig
*Assistant Examiner* — Reva R Moore
(74) *Attorney, Agent, or Firm* — Yee & Associates, P.C.

(57) ABSTRACT

A method, apparatus, and computer program product for configuring a payroll system. The method identifies a subset of rules from a group of payroll rules. The subset of rules correctly correlates payroll input data to payroll output data for a legacy payroll system of an organization. The method translates the subset of rules into a group of policy configuration options for a group of payroll policy templates. The method receives a selection from the group of policy configuration options to create a policy instance for the payroll processing system. The method configures the payroll processing system according to the policy instance.

33 Claims, 11 Drawing Sheets

PAYROLL POLICY MINER

BACKGROUND INFORMATION

1. Field

The present disclosure relates generally to an improved computer system and, in particular, to a method and apparatus for a policy driven payroll engine. Still more particularly, the present disclosure relates to a method and apparatus for an improved computer system that configures a payroll policy using one or more rules identified from a legacy payroll system.

2. Background

Information systems are used for many different purposes. For example, an information system may be used by a human resources department to maintain benefits and other records about employees. For example, the human resources department may manage health insurance, wellness plans, and other programs in an organization using the information system.

As another example, the information system may be used to run a payroll to generate paychecks for the employees in the organization. The information system in the form of a payroll processing system performs functions, such as calculating salary payments, bonuses, deductions, withholdings, taxes, and other suitable functions involved with running the payroll for the organization.

Different departments in the organization may have responsibilities that impact payroll processing. For example, a benefits department in the organization may have a retirement benefits policy that is used to manage retirement benefits. This department may manage eligibility, vesting schedules, withholdings, and other items relating to the retirement benefits.

As another example, the human resources department may have a policy for uniform benefits. The human resources department may identify which employees may be eligible to receive a uniform allowance for dress codes for a particular position. The policy may define who is eligible for a uniform allowance, how claims are submitted, and how credits may be obtained.

Different policies in the different departments result in reimbursements, deductions, bonuses, and other items that are taken into account when processing the payroll. The payroll impact may be an effect on the employee's net pay, tax applicable earnings, payments to third parties, and submissions to authorities. Each of these different departments may have information systems that generate deductions, reimbursements, withholdings, or other items that are used in running the payroll.

Configuring an information system to implement the policy in the organization is complex and time-consuming. For example, for organizations having different geographic locations, the policies for running the payroll may be dependent on laws for a particular geographic location, such as a city, a state, or a country. With this situation, different legacy systems for the payroll are often used for the different geographic locations.

Transitioning from disparate legacy systems to a new payroll system necessitates identifying each of these policies as well as the conditions under which each of the policies are applicable to different employees. This on-boarding process often involves utilizing a consultant to meticulously identify and implement the complexities of these policies. The consultant works with people in the organization to identify the policies relating to the payroll and implement those policies in one or more information systems by writing code, setting parameters, or performing other operations in the information system.

Therefore, it would be desirable to have a method and apparatus that take into account at least some of the issues discussed above, as well as other possible issues. For example, it would be desirable to have a method and apparatus that overcome a technical problem with the complexity of configuring an information system to implement a business policy in an organization.

SUMMARY

An embodiment of the present disclosure provides a method for configuring a payroll processing system. A computer system identifies a subset of rules from a group of payroll rules. The subset of rules correctly correlates payroll input data to payroll output data for a legacy payroll system of an organization. The computer system translates the subset of rules into a group of policy configuration options for a group of payroll policy templates. The computer system receives a selection from the group of policy configuration options to create a policy instance for the payroll processing system. The computer system configures the payroll processing system according to the policy instance.

Another embodiment of the present disclosure provides a payroll policy miner for a payroll system. The payroll policy miner comprises a hardware processor and a policy builder in communication with the hardware processor. The policy builder identifies a subset of rules from a group of payroll rules. The subset of rules correctly correlates payroll input data to payroll output data for a legacy payroll system of an organization. The policy builder translates the subset of rules into a group of policy configuration options for a group of payroll policy templates. The policy builder receives a selection from the group of policy configuration options to create a policy instance for a payroll processing system. The payroll system configures the payroll processing system according to the policy instance.

Yet another embodiment of the present disclosure provides a computer program product for configuring a payroll processing system. The computer program product comprises a computer readable storage media and program code are stored on the computer readable storage media. The program code comprises code for identifying a subset of rules from a group of payroll rules. The subset of rules correctly correlates payroll input data to payroll output data for a legacy payroll system of an organization. The program code comprises code for translating the subset of rules into a group of policy configuration options for a group of payroll policy templates. The program code comprises code for receiving a selection from the group of policy configuration options to create a policy instance for a payroll processing system. The program code comprises code for configuring the payroll processing system according to the policy instance.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
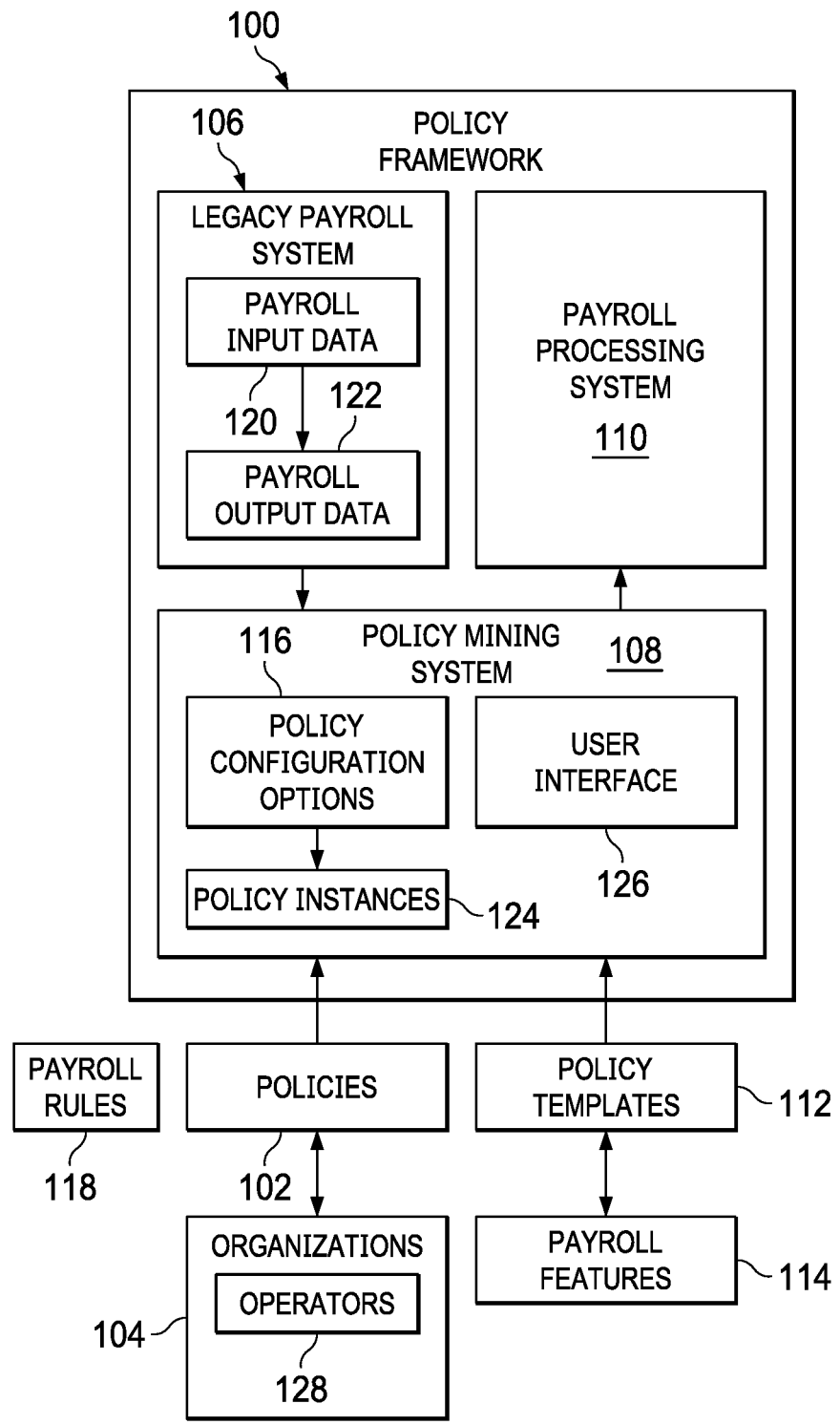
FIG. 1 is an illustration of a block diagram of a policy framework in accordance with an illustrative embodiment.

The illustrative embodiments recognize and take into account one or more different considerations. For example, the illustrative embodiments recognize and take into account that, in addition to time and complexity of configuring information systems in an organization for running a payroll, the different systems often do not provide a seamless process in running the payroll. The illustrative embodiments recognize and take into account that different information systems may have different terminology for the different applications running on the information systems. As a result, users of the information systems are required to learn the terminology specifically as it relates to configurations settings for each of the different applications.

Further, the illustrative embodiments recognize and take into account that configuring currently available information systems requires a technical knowledge of the information systems and applications that run on the information systems. Also, the illustrative embodiments recognize and take into account many applications that do not provide an ability to control as many details as needed to implement policies for the organization in a desired manner. The illustrative embodiments recognize and take into account that this situation may result in the organization changing, omitting, or having workarounds for portions of a policy when using a particular application.

Further, many information systems used to run the payroll are hardcoded. In other words, the applications or other software for running the payroll are customized or configured to meet the policies of a particular organization. As a result, if the policies in the organization change, reconfiguration of the applications or other software may take more time than desired. Thus, a technical problem is present with the time and effort needed to change the applications or other software for running the payroll when the policies within the organization change.

Thus, the illustrative embodiments provide a method and apparatus for configuring a payroll processing system. In one illustrative example, the payroll policy miner comprises a hardware processor and a policy builder in communication with the hardware processor. The policy builder identifies a subset of rules from a group of payroll rules. The subset of rules correctly correlates payroll input data to payroll output data for a legacy payroll system of an organization. The policy builder translates the subset of rules into a group of policy configuration options for a group of payroll policy templates. The policy builder receives a selection from the group of policy configuration options to create a set of policy instances for a payroll processing system. The payroll processing system then applies the policy instances to the relevant employee data, and the policy options define the specific applicable calculation or formula to result in a correct payroll result.

As used herein, "a group of," when used with respect to items, mean one or more items. For example, "a group of payroll rules" is one or more payroll rules.

With reference now to the figures and, in particular, with reference to FIG. 1, an illustration of a block diagram of a policy framework is depicted in accordance with an illustrative embodiment. In this depicted example, policy framework 100 is an example of a structure in which policies 102 may be implemented by organizations 104.

As depicted, policy framework 100 includes legacy payroll system 106, policy mining system 108, and payroll processing system 110. Legacy payroll system 106 is an existing payroll system used to run payroll for organizations 104. Legacy payroll system 106 may be hardcoded to meet policies 102; legacy payroll system 106 may be customized or configured to meet policies 102 of organizations 104. As a result, reconfiguration of legacy payroll system 106 to control details needed to implement policies 102 may require a technical knowledge of legacy payroll system 106, as well as the information systems that run legacy payroll system 106.

Payroll processing system 110 uses policy templates 112 to implement policies 102. Policy templates 112 represent payroll features 114 that may be implemented by organizations 104. For example, a payroll feature in payroll features 114 may include, for example, retirement savings, 401(k) employer matches, tax withholdings, reimbursements, reporting, vacation time, and other suitable features that are used by organizations 104 in running a payroll.

Policy mining system 108 identifies policy configuration options 116 for policy templates 112. Policy configuration options 116 represent payroll rules 118 used by payroll processing system 110 to implement payroll features 114. Payroll rules 118 can be, for example, a group of calculations, algorithms, formulas, and combinations thereof used by payroll processing system 110 to determine payroll features 114.

In this illustrative example, policy mining system 108 identifies policy configuration options 116 based on payroll input data 120 and payroll output data 122 of legacy payroll system 106. Policy mining system 108 identifies rules or sets of rules from payroll rules 118 that correctly correlate payroll input data 120 to payroll output data 122. Policy mining system 108 then translates the identified rules into policy configuration options 116.

Figure 2:
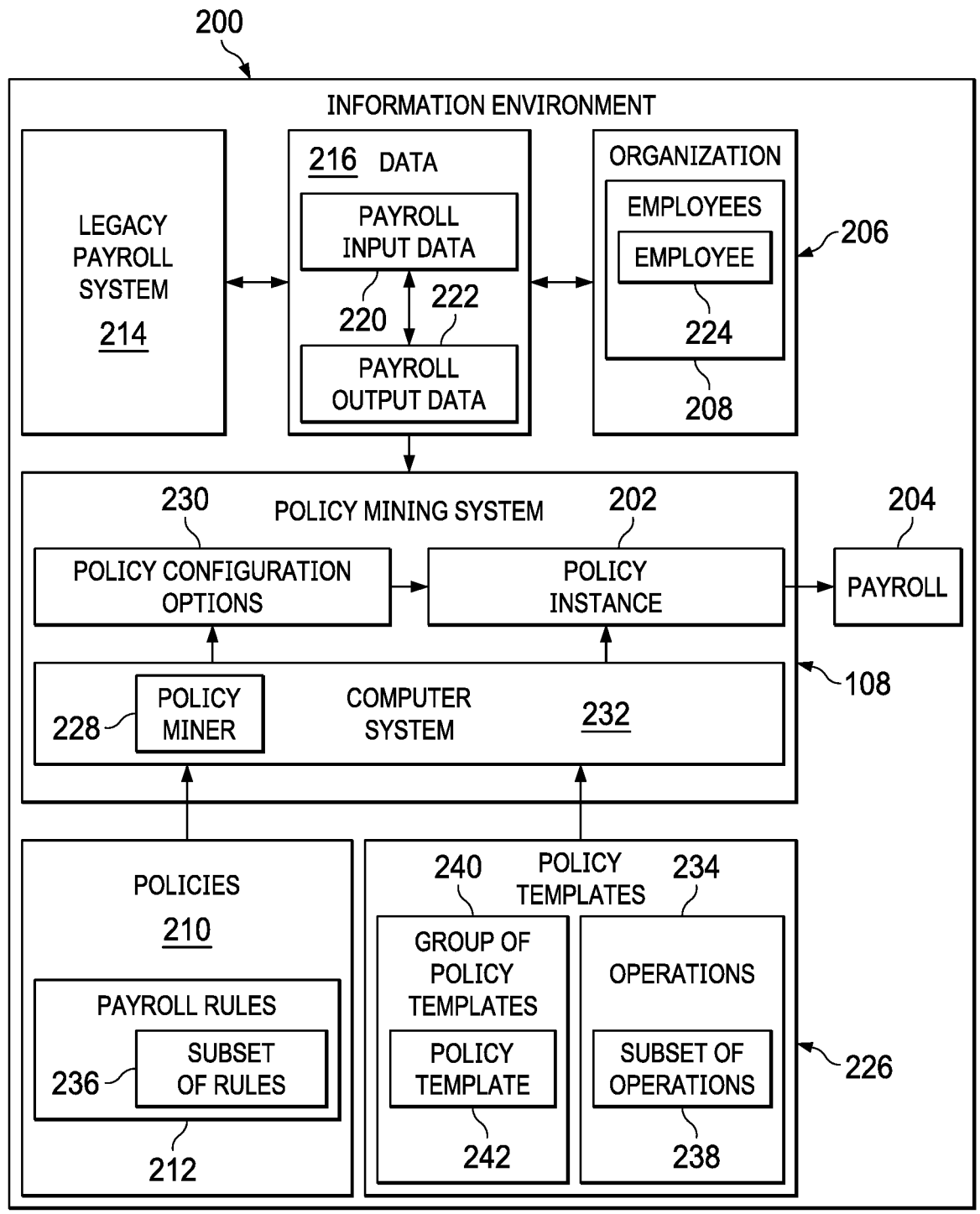
FIG. 2 is an illustration of a block diagram of an information environment in accordance with an illustrative embodiment.

Through the selection of specific ones of policy configuration options 116 identified from data 216, as shown in block form in FIG. 2, policy instances 124 are created that implement payroll features 114 for organizations 104. In this illustrative example, policy mining system 108 provides user interface 126 to operators 128 in organizations 104 to create policy instances 124 from policy templates 112 and policy configuration options 116 selected by operators 128 in organizations 104.

In one illustrative example, policy mining system 108 automatically selects options from policy configuration options 116 to create policy instances 124 for payroll processing system 110 by selection and configuration of policy options. Policy mining system 108 may further automatically configure payroll processing system 110 according to policy instances 124. By automatically selecting options from policy configuration options 116 and automatically configuring payroll processing system 110, policy mining system 108 accelerates the configuring of payroll processing system 110.

As depicted, payroll processing system 110 is used for payroll processing using policy instances 124. In this manner, one or more components in policy framework 100 provide a technical solution to overcome the technical problem with the complexity of configuring an information system to implement a policy in an organization. For example, the different policies of different organizations can be captured and translated into policy configuration options based on existing data from the legacy system. Thus, the use of policy templates and policy configuration options identified from legacy payroll systems allows a way to capture the business concepts from a legacy payroll system and to translate the associated requirements for implementing those business concepts directly to the policy based payroll processing system.

In policy framework 100, legacy payroll system 106, policy mining system 108, and payroll processing system 110 are physical hardware components that also may include software. For example, legacy payroll system 106, policy mining system 108, and payroll processing system 110 may be implemented using one or more computer systems.

A computer system is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or other suitable data processing systems.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference next to FIG. 2, an illustration of a block diagram of an information environment is depicted in accordance with an illustrative embodiment. In the illustrative examples, the same reference numeral may be used in more than one figure. This reuse of a reference numeral in different figures represents the same element in the different figures.

In this depicted example, information environment 200 includes policy mining system 108 previously shown in block form in FIG. 1. As depicted, policy mining system 108 generates policy instance 202 for running payroll 204 for organization 206 using a policy-based payroll system, such as payroll processing system 110 shown in block form in FIG. 1.

In the illustrative example, payroll 204 is a process for identifying payment for employees 208 in organization 206. For example, payroll 204 may be performed to identify a payment for employees 208 in organization 206 using employment-related compensation, benefits, associated statutory, and other deductions. Organization 206 may take different forms. For example, organization 206 may be selected from one of a company, a partnership, a charity, an educational group, a social group, a team, a city, a group of employees, a union, a government agency, or some other suitable type of organization.

As depicted, organization 206 has policies 210. A policy in policies 210 can be selected from one of a uniform policy, a regular pay policy, a union policy, a retirement savings policy, a pension policy, an overtime policy, or some other suitable type of policy.

A policy in policies 210 comprises one or more payroll rules 212. Each policy in a group of policies 210 has one or more payroll rules 212. As depicted, payroll rules 212 define how payroll 204 should be run for employees 208.

In the illustrative example, legacy payroll system 214 is an example of legacy payroll system 106 of FIG. 1. In this illustrative example, policies 210 may be hardcoded into legacy payroll system 214, obfuscating payroll rules 212 used by legacy payroll system 214 to implement policies 210.

In the illustrative example, data 216 is information associated with legacy payroll system 214. Data 216 can include information for employees 218 that is accessed by legacy payroll system 214. Data 216 may be located in a data structure, such as a table, a database, a flat file, or some other suitable type of data structure.

In the illustrative example, data 216 includes payroll input data 220 and payroll output data 222. Payroll input data 220 is information about employees 208 used by legacy payroll system 214 to run a payroll for employee 224. For example, payroll input data 220 may include at least one of a name of employee 224, a salary, a number of hours worked, an employee identifier, an amount of withholding for benefits, or other suitable information needed to perform payroll using legacy payroll system 214.

Payroll output data 222 is information about employee 224 generated by legacy payroll system 214. For example, payroll output data 222 may include at least one of a name of employee 224, a gross pay, a net pay, federal withholdings, Social Security taxes, Medicare taxes, state withholdings, local taxes, voluntary deductions, involuntary deductions, or other suitable information generated by legacy payroll system 214.

In the illustrative example, policy templates 226 are present for policies 210 in running payroll 204. In this example, policy templates 226 are examples of policy templates 112 shown in block form in FIG. 1.

Policy templates 226 are frameworks for implementing policies 210 in a payroll processing system, such as payroll processing system 110 shown in block form in FIG. 1. A policy template in policy templates 226 may be completed for use in implementing a policy in policies 210.

As depicted, policy miner 228 in policy mining system 108 uses payroll input data 220 and payroll output data 222 to identify policy configuration options 230. Policy miner 228 may be implemented in software, hardware, firmware, or a combination thereof. When software is used, the operations performed by policy miner 228 may be implemented in program code configured to run on hardware, such as a processor unit. When firmware is used, the operations performed by policy miner 228 may be implemented in program code and data and stored in persistent memory to run on a processor unit. When hardware is employed, the hardware may include circuits that operate to perform the operations in policy miner 228.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors. In this illustrative example, policy miner 228 is located in computer system 232 in policy mining system 108.

In this illustrative example, policy templates 226 include operations 234. Operations 234 are a group of calculations, algorithms, formulas, and combinations thereof used to implement payroll rules 212 in policy templates 226. Different ones of policy templates 226 may use different ones of operations 234 to implement different ones of payroll rules 212.

In identifying policy configuration options 230, policy miner 228 identifies subset of rules 236. Subset of rules 236 is payroll rules 212 that correspond to subset of operations 238. Subset of operations 238 correctly correlates payroll input data 220 to payroll output data 222.

In this illustrative example, policy mining system 108 identifies subset of rules 236 using operations 234. Operations 234 are a group of calculations, algorithms, formulas, and combinations thereof used by to implement payroll rules 212 in policy templates 226. In this illustrative example, policy miner 228 applies one or more of operations 234 to payroll input data 220 and compares the result to payroll output data 222.

If the result matches payroll output data 222, policy miner 228 identifies the applied ones of operations 234 as one of subset of operations 238. Policy templates 226 that implement subset of operations 238 are then included in group of policy templates 240. Payroll rules 212 that are associated with group of policy templates 240 are then identified as one of subset of rules 236.

Policy miner 228 translates subset of rules 236 into policy configuration options 230. Policy configuration options 230 are options that may be selected for implementing subset of rules 236 in group of policy templates 240. Policy configuration options 230 can include at least one of calculation options and processing options. As depicted, the selection of policy configuration options 230 form instance-specific information for creating policy instance 202 from policy template 242.

Calculation options are different operations of subset of operations 238 that may be performed to implement subset of rules 236 represented by policy template 242. For example, calculation options may be whether the employer contribution is a percent match or is up to a certain amount with retirement benefits. These two options use different calculations. Selection of one of these calculation options results in particular operations of subset of operations 238 being implemented in policy instance 202 which is then processed by payroll 204.

As another example, calculation options may be by employer or employee level. For example, when policy miner 228 identifies policy configuration options 230 as an employee level, different types of contribution may apply to different ones of employees 208. For example, policy miner 228 may identify a five percent contribution for employee 224, while a different amount may be identified for other employees of employees 208.

In the illustrative example, processing options are options for performing calculation options. Processing options can include at least one of rounding, pro-rata calculations, retroactive behavior, or other options that may be used for performing calculation options. For example, rounding may include rounding up pay calculations while deductions are rounded down when performing calculations for running payroll 204.

As depicted, policy template 242 may be implemented according to policy configuration options 230 to form policy instance 202. Policy instance 202 is an instantiation of policy template 242. Policy instance 202 implements subset of rules 236 for policies 210 selected from policy configuration options 230. In other words, policy instance 202 is a copy of policy template 242 in group of policy templates 240 that has been configured according to selected policy configuration options 230. In other words, selected policy configuration options 230 are applied to policy template 242 to form policy instance 202. Policy template 242 remains unchanged for the creation of additional policy instances.

In one illustrative example, one or more technical solutions are present that overcome a technical problem with the complexity of configuring an information system to implement a policy in an organization. As a result, one or more technical solutions may provide a technical effect in which the configuring, running, or both, of a payroll in the organization may be performed more efficiently using policy miner 228.

As a result, computer system 232 operates as a special purpose computer system in which policy miner 228 in computer system 232 enables increased efficiency in configuring a payroll processing system, such as payroll processing system 110 shown in block form in FIG. 1. For example, policy miner 228 may identify different policy configuration options from different legacy payroll systems. As a result, less time is required to identify and implement different ones of policies 210.

Thus, policy miner 228 transforms computer system 232 into a special purpose computer system as compared to currently available general computer systems that do not have policy miner 228. For example, a technical problem with the time and effort needed to configure a payroll processing system is overcome using one or more technical solutions for configuring a payroll system using policy configuration options 230 identified by policy miner 228.

Figure 3:
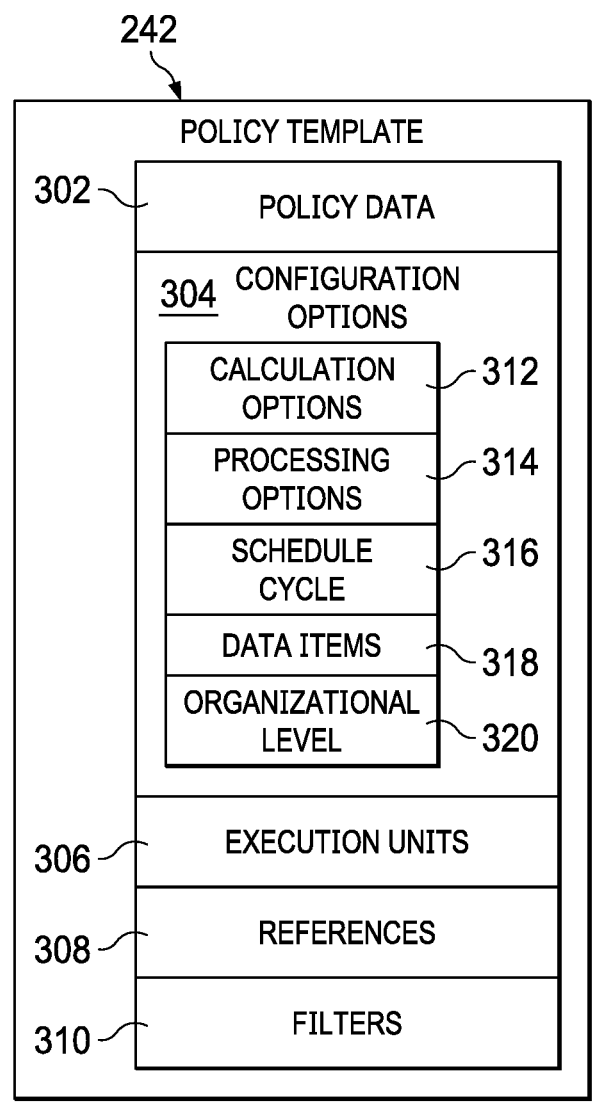
FIG. 3 is an illustration of a block diagram of a template in accordance with an illustrative embodiment.

Turning next to FIG. 3, an illustration of a block diagram of a template is depicted in accordance with an illustrative embodiment. An example of the implementation of policy template 242 shown in block form in FIG. 2 is shown in this figure. In this illustrative example, policy template 242 has a number of different components. As depicted, policy template 242 includes policy data 302, configuration options 304, execution units 306, references 308, and filters 310.

Policy data 302 is data related to a corresponding one of policies 210 shown in block form in FIG. 2 for which policy template 242 is created. Policy data 302 includes at least one of a unique identifier, a description of the policy, a validity period, a version, or other suitable information.

Configuration options 304 are options that may be selected for implementing the policy for which policy template 242 is created in organization 206 shown in block form in FIG. 2. One or more options in configuration options 304 may correspond to policy configuration options 230 shown in block form in FIG. 2. Configuration options 304 include at least one of calculation options 312, processing options 314, schedule cycle 316, data items 318, and organizational level 320. As depicted, the selection of configuration options 304 form instance-specific information for creating policy instance 202 shown in block form in FIG. 2 from policy template 242.

In the illustrative example, calculation options 312 are different ones of operations 234 shown in block form in FIG. 2 that may implemented by different policy instances. For example, calculation options 312 may be whether the employer contribution is a percent match or is up to a certain amount with retirement benefits. These two options use different calculations. Selection of one of these calculation options results in a particular calculation being selected that is implemented in policy instance 202 shown in block form in FIG. 2.

As another example, calculation options 312 may be by employer or employee level. For example, different types of contributions may be applied to different employees according to an employee level within an organization. For example, calculation options 312 may allow a five percent contribution for employees at a particular employee level, while another employee at a different employee level may be allowed a different contribution.

As depicted, calculation options 312 may be represented in a number of different ways. For example, calculation options 312 may identify calculations using at least one of identifiers, payroll classification codes, names, or other types of identification schemes.

In the illustrative example, processing options 314 are options that may be selected for performing calculations in calculation options 312. As depicted, processing options 314 include at least one of rounding, pro-rata calculations, retroactive behavior, or other options that may be used for performing calculations selected from calculation options 312. For example, rounding may include rounding up pay calculations while deductions are rounded down when performing calculations for running payroll.

Schedule cycle 316 defines when corresponding ones of policies 210 in FIG. 2 are applied. For example, schedule cycle 316 may state that a policy is always applicable, define a group of periods of time when a policy is applicable, or identify events that result in the application of a policy.

As another example, schedule cycle 316 may include at least one of a frequency cycle, a period selection, or worker elections. The frequency cycle may define how often a payroll is run. The frequency cycle may be, for example, weekly, biweekly, or monthly. In another example, the policy may be applied on a period selection, such as a first payroll period, a second payroll period, or some other payroll period. Further, an employee may elect when to apply the policy in schedule cycle 316.

Data items 318 identify data that is needed for calculations. Data items 318 may include an identification of parameters and sources of values for the parameters. Data items 318 may include data bindings to the sources of data. With data bindings, changes to the parameters at either a source or in the policy instance created from policy template 242 may be reflected in both the source of the data and policy instance 202 in FIG. 2.

For example, a data item in data items 318 may include how many hours an employee worked. In another example, the data item may be a number of miles driven for mileage reimbursements.

Organizational level 320 indicates how policy template 242 is to be applied. For example, policy template 242 may be applicable to an individual, a team, a department, an entire organization, or at some other level. In the list of examples, policy template 242 may be applicable to many different levels depending on how policy template 242 is defined.

As depicted, execution units 306 are groupings of program code that are used to perform calculations. Particular ones of execution units 306 are used based on which ones of calculation options 312 are selected. Execution units 306 may be identified through pointers, universal resource locations, unique identifiers, or other mechanisms for identifying execution units 306 that are in policy template 242.

References 308 are for information about a corresponding one of policies 210 in FIG. 2. References 308 may include at least one of links, universal resource locators, pointers, or other mechanisms used to access the information.

As depicted, filters 310 are filters that can be applied during a search for policies. For example, filters 310 may include at least one of a country, an industry, a location, a union, or other items that may be used to filter the policies. Filters 310 allow policy miner 228 shown in block form in FIG. 2 to limit a search space when identifying subset of rules 236 in FIG. 2, and therefore more quickly identify policy configuration options 230 in FIG. 2 that may be applicable based on data from legacy payroll system 214 in FIG. 2.

Figure 4:
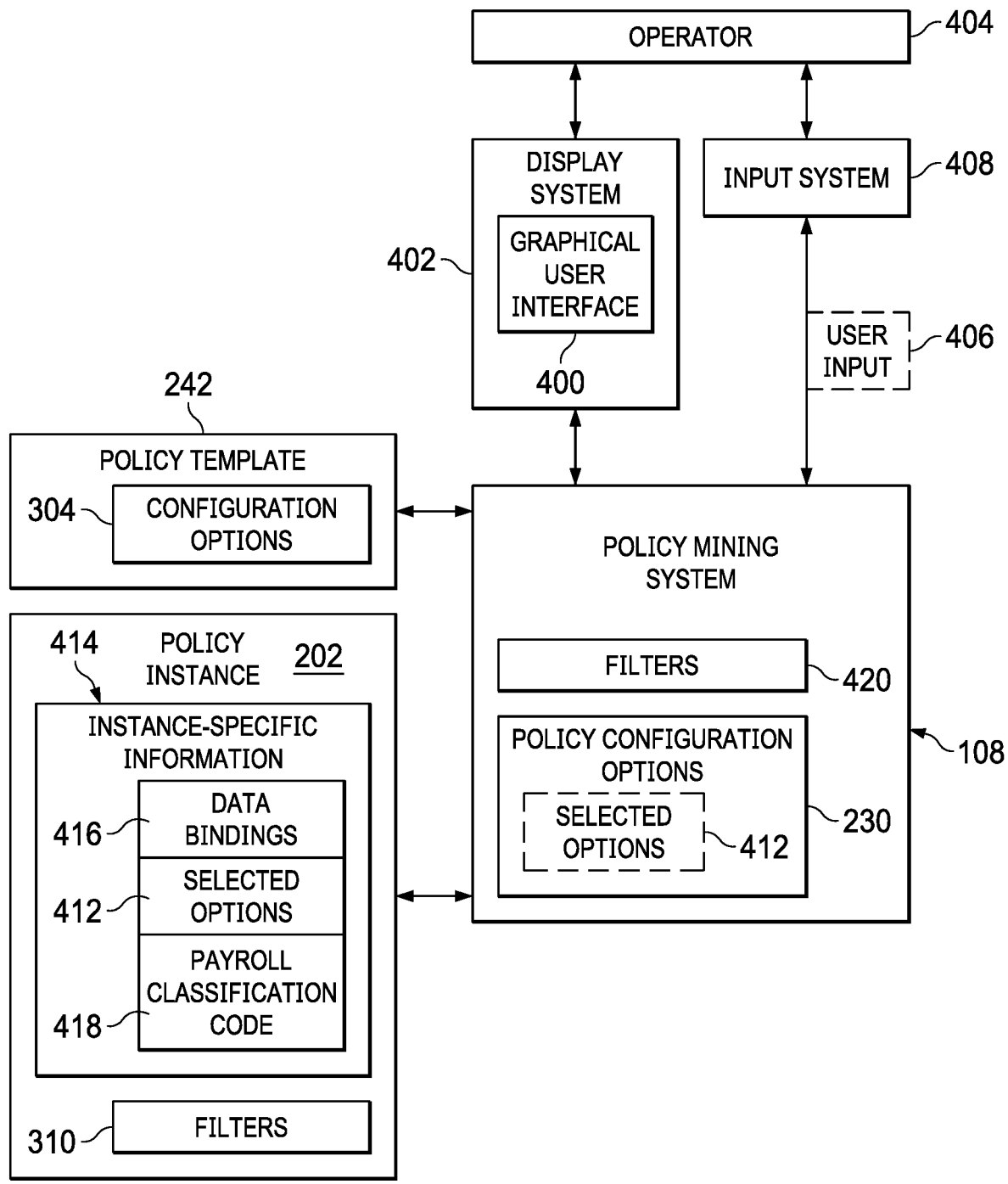
FIG. 4 is an illustration of a block diagram of dataflow used to create a policy instance from a policy template in accordance with an illustrative embodiment.

Turning next to FIG. 4, an illustration of a block diagram of dataflow used to create a policy instance from a policy template is depicted in accordance with an illustrative embodiment. In this illustrative example, policy mining system 108 operates to create policy instance 202 from policy template 242.

In this illustrative example, policy mining system 108 displays user interface 126 shown in block form in FIG. 1 in the form of graphical user interface 400 on display system 402 to operator 404. Display system 402 is a physical hardware system and includes one or more display devices on which graphical user interface 400 may be displayed. The display devices may include at least one of a light emitting diode (LED) display, a liquid crystal display (LCD), an organic light emitting diode (OLED) display, or some other suitable device on which graphical user interface 400 can be displayed.

Operator 404 is a person that may interact with graphical user interface 400 through user input 406 generated by input system 408 for policy mining system 108, which includes a computer system. Operator 404 is an example of operators 128 shown in block form in FIG. 1. Input system 408 is a physical hardware system and may be selected from at least one of a mouse, a keyboard, a trackball, a touchscreen, a stylus, a motion sensing input device, a cyber glove, or some other suitable type of input device.

Graphical user interface 400 provides operator 404 an ability to see and make selections from policy configuration options 230. The selections are made to implement desired policies in policies 210 shown in block form in FIG. 2.

In this illustrative example, operator 404 has selected options 412 for use in creating policy instance 202 that is specific for organization 206 shown in block form in FIG. 2. As depicted, the selection is made through user input 406 when operator 404 interacts with graphical user interface 400. Policy mining system 108 creates a copy of policy template 242 that becomes policy instance 202. Policy instance 202 is created when the copy of policy template 242 includes selected options 412 in instance-specific information 414, as selected by operator 404 from policy configuration options 230 through user input 406 when interacting with graphical user interface 400.

As depicted, operator 404 generates user input 406 to create policy instance 202 from policy template 242. In this illustrative example, operator 404 generates user input 406 to select selected options 412. The selection of selected options 412 may include at least one of selecting or entering information for configuration options 304. In this illustrative example, the different steps performed by operator 404 implement policy instance 202 to follow a particular policy that is identified for organization 206 based on payroll input data 220 and payroll output data 222 of legacy payroll system 214, all shown in block form in FIG. 2.

In this particular example, instance-specific information 414 in policy instance 202 includes data bindings 416, selected options 412, and payroll classification code 418. As depicted, data bindings 416 are references to data items 318 shown in block form in FIG. 3. Data bindings 416 identify sources of data that are used by payroll processing system 110 of FIG. 1 for running a payroll. In this illustrative example, payroll classification code 418 is used to identify a group of execution units that will perform calculations and other processing.

As depicted, filters 420 are filters that can be applied to limit a search space when identifying policy configuration options 230. For example, filters 420 may include at least one of a country, an industry, a location, a union, or other items that may be used to filter the policies. Filters 420 may correspond to filters 310 shown in block form in FIG. 3. Filters 420 allow policy mining system 108 to more quickly find the policies that may be applicable to an organization.

Figure 5:
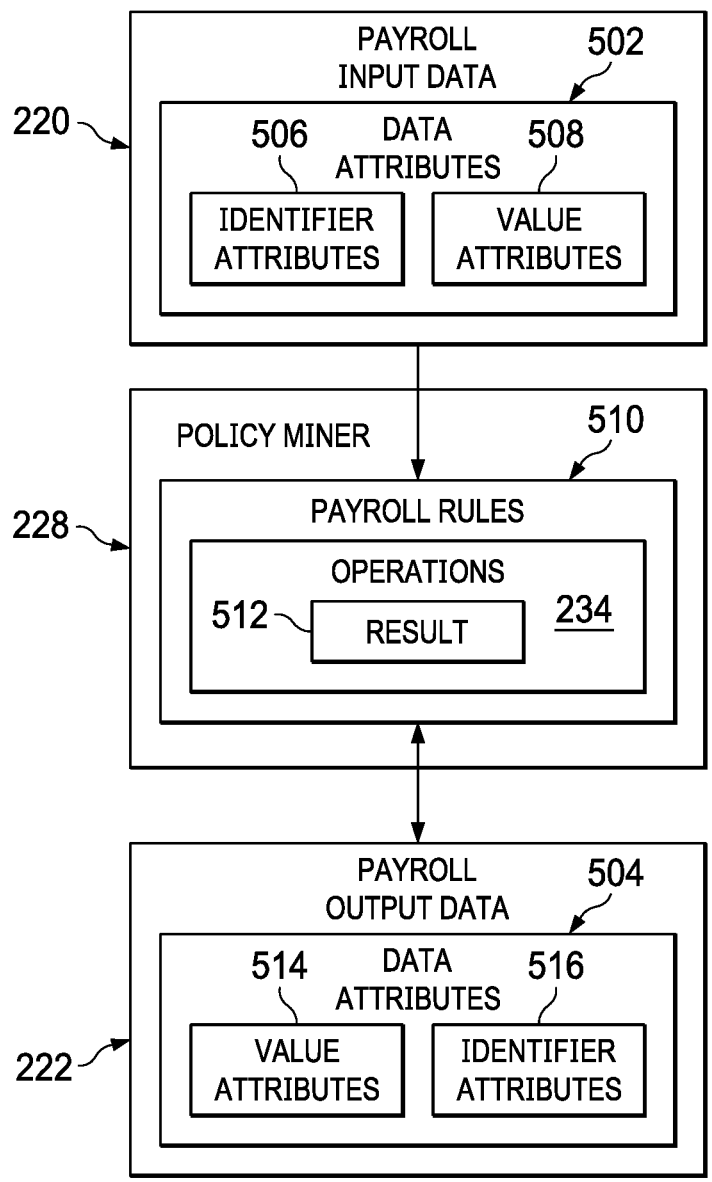
FIG. 5 is an illustration of a block diagram of dataflow used to identifying a group of payroll rules that correctly correlates legacy payroll data by direct matching of data attributes in accordance with an illustrative embodiment.

Turning next to FIG. 5, an illustration of a block diagram of dataflow used to identifying a group of payroll rules that correctly correlates legacy payroll data by direct matching of data attributes is depicted in accordance with an illustrative embodiment. In this illustrative example, policy mining system 108 operates to determine subset of rules 236 shown in block form in FIG. 2 by direct matching of data attributes 502 of payroll input data 220 to data attributes 504 of payroll output data 222.

In this illustrative example, data attributes 502 of payroll input data 220 includes identifier attributes 506 and value attributes 508. Identifier attributes 506 are information that uniquely identifies a particular data element of payroll input data 220. For example, identifier attributes 506 can include an identity of an organization, an identity of an employee, a description of a particular data element, a pay period, a pay element such as a salary, a number of hours worked, an amount of withholding for benefits, or some other suitable attribute.

Value attributes 508 are numerical information identified by identifier attributes 506. For example, value attributes 508 can include an amount, a rate, a number, or some other suitable attribute that designates a corresponding value for one of identifier attributes 506.

Policy miner 228 applies payroll rules 510 to value attributes 508 of payroll input data 220 to generate results 512. Policy miner 228 then compares results 512 to value attributes 514 of payroll output data 222. Policy miner 228 identifies payroll rules 510 as ones of subset of rules 236 in FIG. 2 when result 512 matches one or more of value attributes 514.

In an illustrative example, policy miner 228 may limit a search space required when applying payroll rules by comparing identifier attributes 506 to identifier attributes 516. In this manner, policy miner 228 applies payroll rules 510 to data elements of payroll input data 220 only if identifier attributes 506 match one or more of identifier attributes 516.

Figure 6:
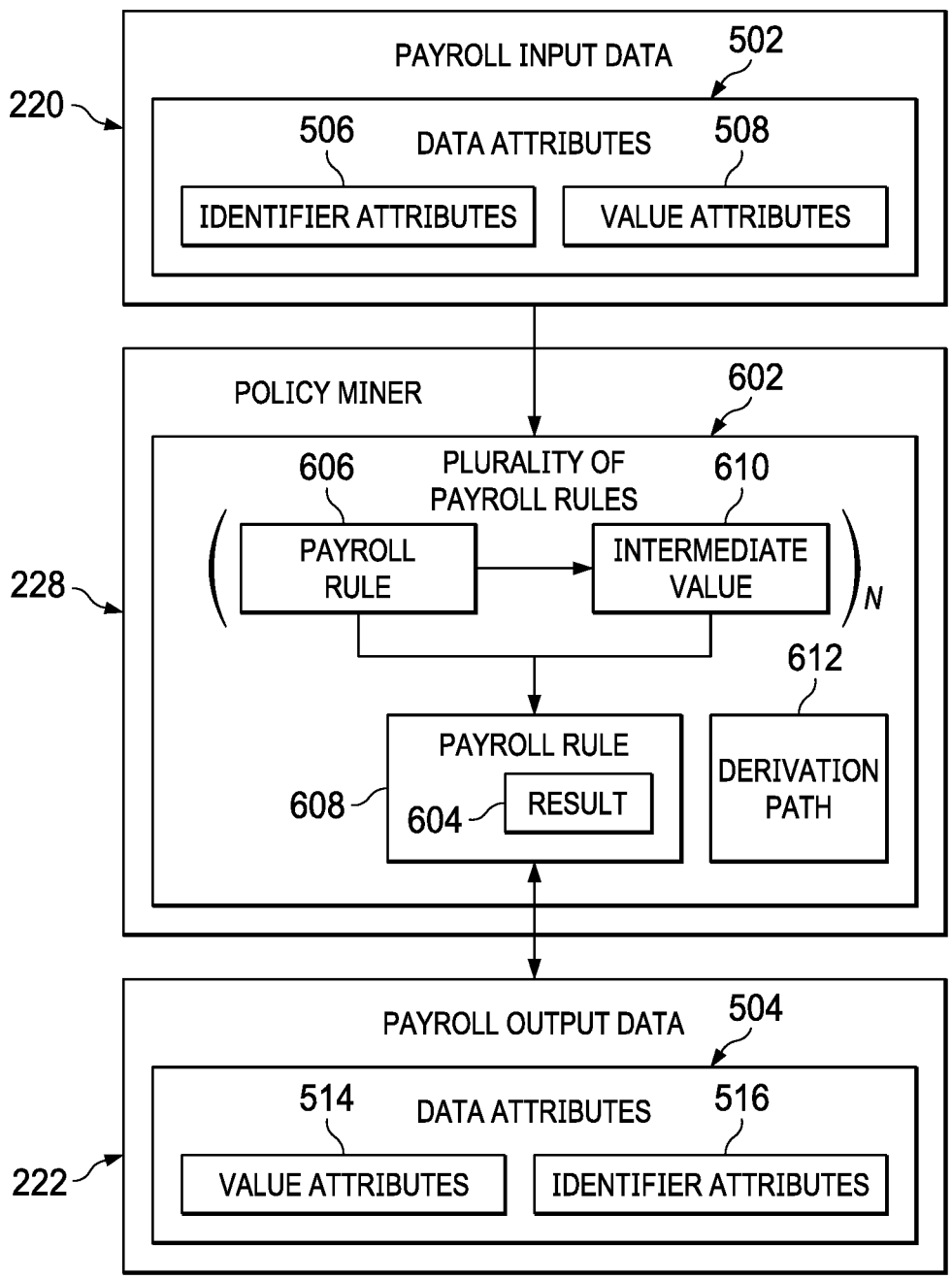
FIG. 6 is an illustration of a block diagram of dataflow used to identifying a group of payroll rules that correctly correlates legacy payroll data by indirect matching of data attributes in accordance with an illustrative embodiment.

Turning next to FIG. 6, an illustration of a block diagram of dataflow used to identify a group of payroll rules that correctly correlates legacy payroll data by indirect matching of data attributes is depicted in accordance with an illustrative embodiment. In this illustrative example, policy mining system 108 operates to determine subset of rules 236 in FIG. 2 by indirect matching of data attributes 502 of payroll input data 220 to data attributes 504 of payroll output data 222.

Policy miner 228 applies plurality of payroll rules 602 to value attributes 508 of payroll input data 220 to generate result 604. Plurality of payroll rules 602 is two or more of payroll rules 212 of FIG. 2. As depicted, plurality of payroll rules 602 is illustrated as including payroll rule 606 and payroll rule 608. However, it is appreciated that the illustration of two payroll rules is for clarity purposes only. It is appreciated that plurality of payroll rules 602 may include additional payroll rules to generate additional intermediate values as discussed below.

Policy miner 228 applies payroll rule 606 to value attributes 508 of payroll input data 220 to generate intermediate value 610. Policy miner 228 applies payroll rule 608 to intermediate value 610 to generate result 604. Policy miner 228 then compares result 604 to value attributes 514 of payroll output data 222. Policy miner 228 identifies plurality of payroll rules 602 as ones of subset of rules 236 in FIG. 2 when result 604 matches one or more of value attributes 514.

Derivation path 612 provides a recorded sequence of payroll rules applied in plurality of payroll rules 602. Therefore, in this illustrative example, derivation path 612 includes the ordered sequence of payroll rule 606 and payroll rule 608.

Policy miner 228 links derivation path 612 to a corresponding one of policy configuration options 230 shown in block form in FIG. 2. If derivation path 612 is linked to selected options 412 shown in block form in FIG. 4, policy miner 228 records derivation path 612 as part of instance-specific information 414 shown in block form in FIG. 4.

In an illustrative example, policy miner 228 may limit a search space required when applying payroll rules by comparing identifier attributes 506 to identifier attributes 516. In this manner, policy miner 228 applies payroll rules 510 to data elements of payroll input data 220 only if identifier attributes 506 matches one or more of identifier attributes 516.

Figure 7:
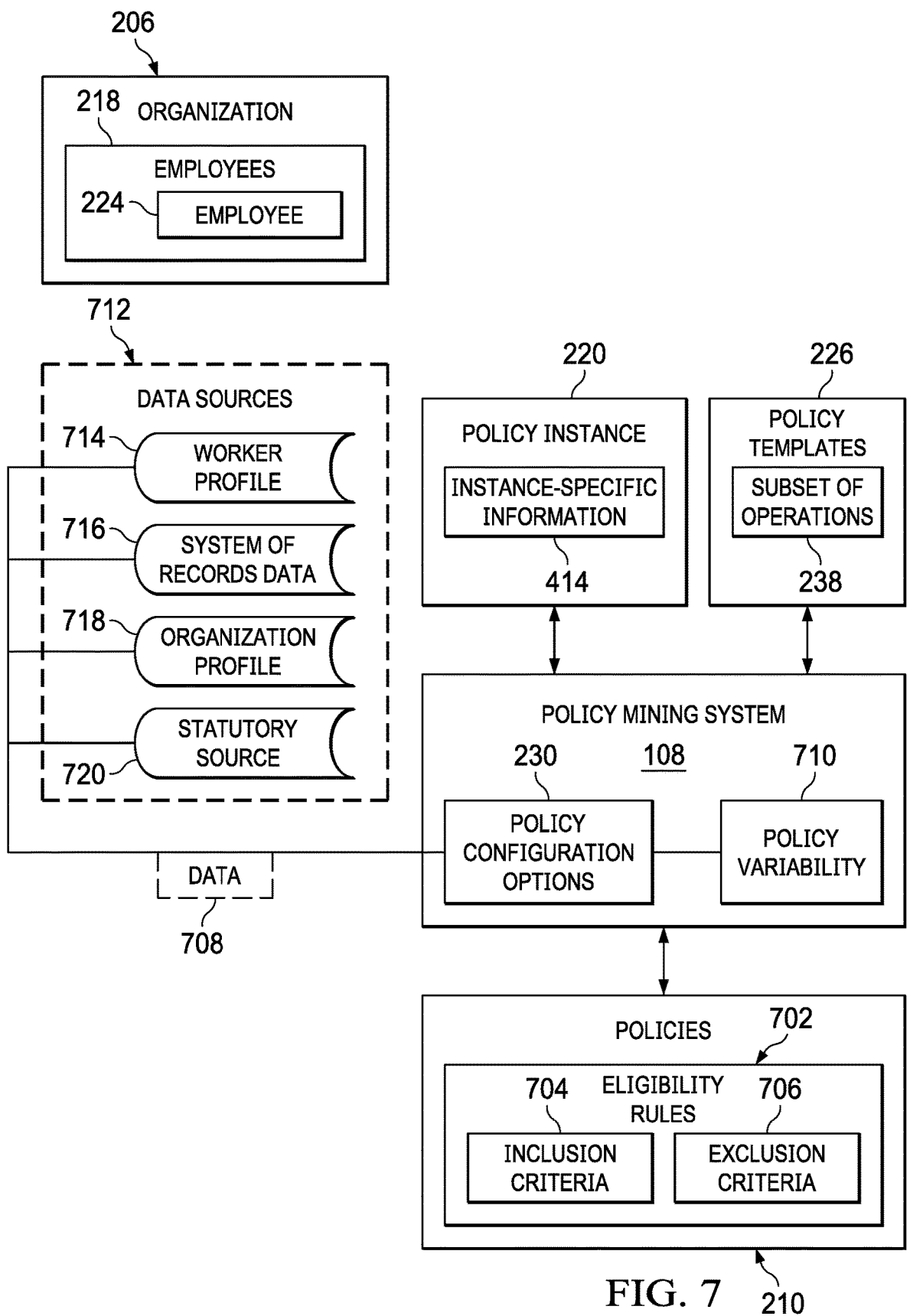
FIG. 7 is an illustration of a block diagram of dataflow used to determine policy variability based on legacy payroll data in accordance with an illustrative embodiment.

Turning next to FIG. 7, an illustration of a block diagram of dataflow used to determine policy variability based on legacy payroll data is depicted in accordance with an illustrative embodiment. In this illustrative example, policy mining system 108 operates to determine eligibility rules 702 based on policy configuration options 230.

Eligibility rules 702 define conditions for applying policies 210 to employees 218. Eligibility rules 702 can include inclusion criteria 704 that define conditions for including employees 218 in the application of policies 210. Eligibility rule 700 can further include exclusion criteria 706 that define conditions for excluding employees 218 from the application of policies 210.

For example, if one of policies 210 is for hourly employees and employee 224 is a salaried employee, then employee 224 is not eligible for the application of that policy. As another example, if one of policies 210 implements reimbursements for a company car policy for executives, then employees 218 who are not an executive are not eligible for the application of that policy.

As depicted, policy mining system 108 identifies the conditions under which a policy in policies 210 should be applied to an employee of employees 218. In this illustrative example, policy mining system 108 compares policy configuration options 230 with data 708 to determine policy variability 710.

As depicted, data 708 is information about employees 218. Data 708 may be data used by payroll processing system 110 shown in block form in FIG. 1 to run payroll for employees 208. Data 216 may be selected from at least one of a salary, a number of hours worked, a name of employee 224, an employee identifier, an amount of withholding for benefits, or other suitable information needed to perform payroll.

Data 708 can be data from data sources 712. As depicted, data sources 712 include worker profile 714, system of records (SOR) data 716, organization profile 718, and statutory source 720.

Worker profile 714 includes information, such as name, address, Social Security number, location, pay type, and other information. System of records data 716 is a data source that is external to policy mining system 108. For example, system of records data 716 may be from a time tracking system, a benefits system, a human resources system, or some other system that is located in or used by organization 206.

Organization profile 718 is information about how organization 206 is organized. For example, organization profile 718 indicates that organization 206 includes a company match for 401(k) retirement accounts that is up to four percent. As another example, organization profile 718 may include the amount of reimbursements for allowances for company cars. Statutory source 720 includes statutory rules that may be applicable to policies 210.

In this example, policy mining system 108 compares policy configuration options 230 with data 708 to determine policy variability 710. Policy variability 710 is common characteristics of employees 218 to which a policy of policies 210 is applicable. For example, policy mining system 108 may determine common characteristics of employees 218 by applying one or more statistical modeling methods to data 708. Policy mining system 108 may then translate the identified common characteristics into eligibility rules 702. Policy mining system 108 can then link eligibility rules 702 to instance-specific information 414 of policy instance 202.

Figure 8:
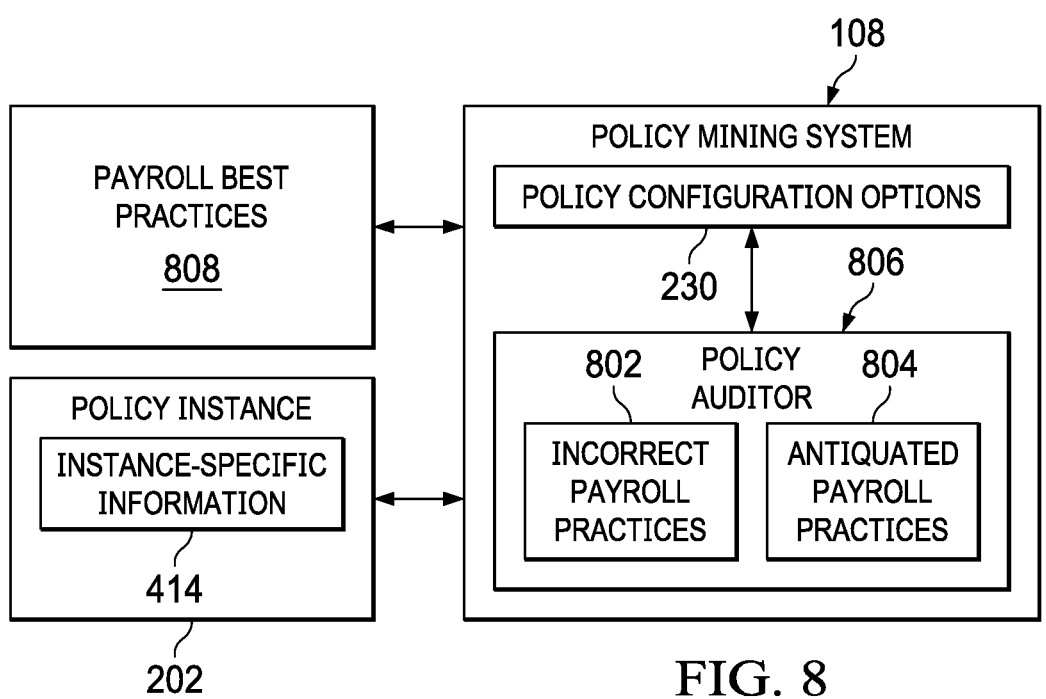
FIG. 8 is an illustration of a block diagram of dataflow used to audit payroll practices of an organization based on policy configuration options in accordance with an illustrative embodiment.

Turning next to FIG. 8, an illustration of a block diagram of dataflow used to audit payroll practices of an organization based on policy configuration options is depicted in accordance with an illustrative embodiment. In this illustrative example, policy mining system 108 operates to determine at least one of incorrect payroll practices 802 and antiquated payroll practices 804.

As depicted, policy mining system 108 includes policy auditor 806. In this illustrative example, policy auditor 806 compares policy configuration options 230 to payroll best practices 808.

Payroll best practices 808 may include one of generally accepted accounting principles and statutory rules that may be applicable to policies 210 shown in block form in FIG. 2. Policy auditor 806 identifies policy configuration options 230 that conflict with payroll best practices 808 as one of incorrect payroll practices 802 or antiquated practices 804. Policy mining system 108 can then flag and report incorrect payroll practices 802 to the operator. The operator may elect to link incorrect payroll practices 802 or antiquated practices 804 to instance-specific information 414 of policy instance 202.

Figure 9:
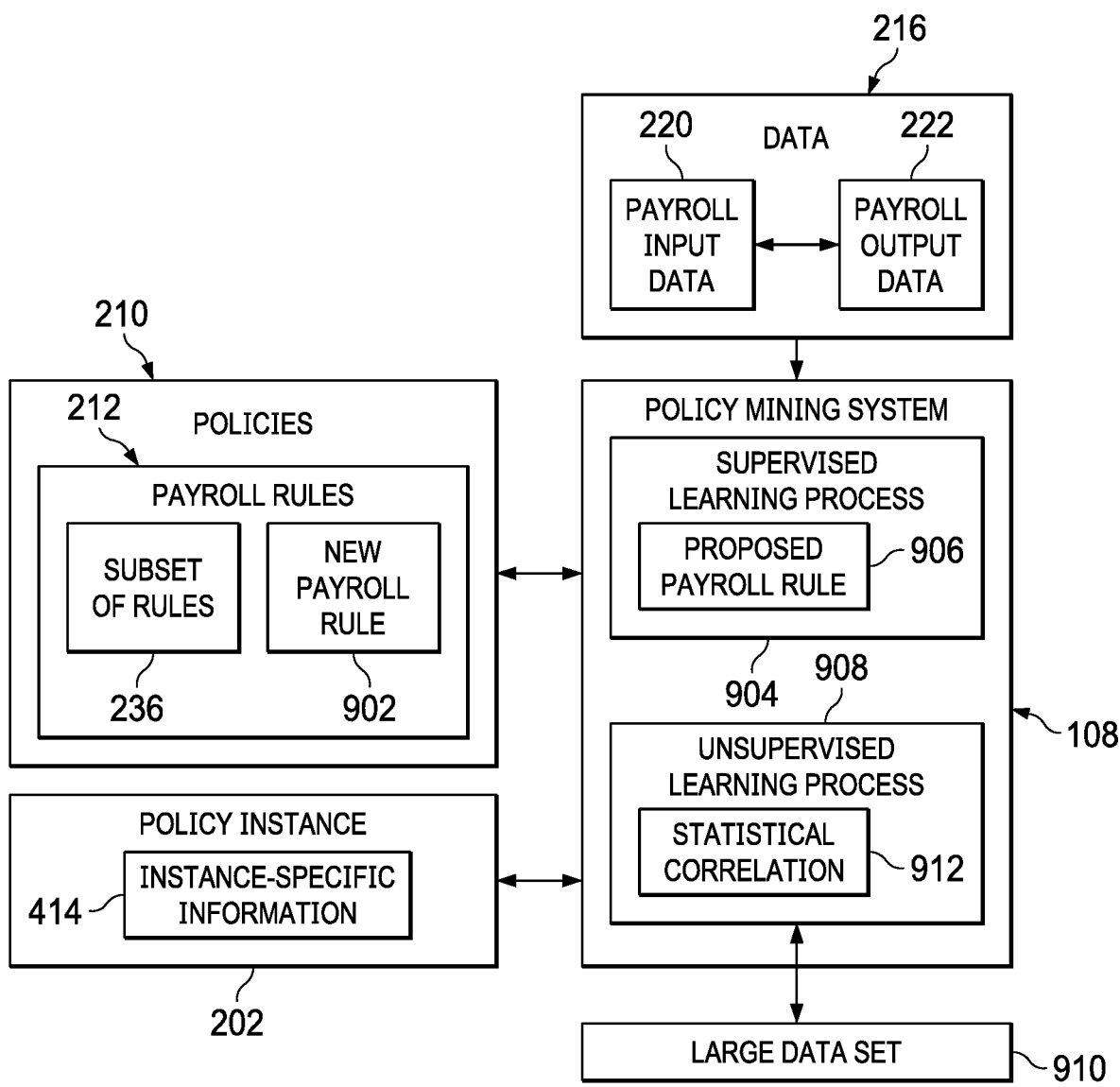
FIG. 9 is an illustration of a block diagram of dataflow for identifying a new payroll rule in accordance with an illustrative embodiment.

Turning next to FIG. 9, an illustration of a block diagram of dataflow for identifying a new payroll rule is depicted in accordance with an illustrative embodiment. In this illustrative example, policy mining system 108 operates to generate new payroll rule 902 when none of payroll rules 212 correctly correlates payroll input data 220 to payroll output data 222 for legacy payroll system 214 shown in block form in FIG. 2.

In one illustrative example, policy mining system 108 generates new payroll rule 902 according to supervised learning process 904. In this example, policy mining system 108 generates proposed payroll rule 906 with possible ambiguity. Proposed payroll rule 906 is then presented to the operator for disambiguation. Based on the operator's choice, the result can be stored related to legacy payroll system 106 for future applications. After the disambiguation, proposed payroll rule 906 correctly correlates payroll input data 220 to payroll output data 222. Proposed payroll rule 906 can correlate data 216 by direct matching of data attributes as illustrated in FIG. 5, or by indirect matching of data attributes as illustrated in FIG. 6.

Policy mining system 108 can then receive validation of proposed payroll rule 906. For example, an operator, such as operator 404 in FIG. 4, may validate proposed payroll rule 906 through user input 406 to graphical user interface 400 in FIG. 4.

Responsive to receiving validation of proposed payroll rule 906, policy mining system 108 stores proposed payroll rule 906 as new payroll rule 902 in payroll rules 212. Policy mining system 108 can then link new payroll rule 902 to instance-specific information 414 of policy instance 202.

In one illustrative example, policy mining system 108 generates new payroll rule 902 according to unsupervised learning process 908. In this example, policy mining system 108 statistically correlates payroll input data 220 to payroll output data 222 over large data set 910 to generate new payroll rule 902. Statistically correlating payroll input data 220 and payroll output data 222 can include resolving usage ambiguities for subset of rules 236 based on statistical correlation 912 of data 216 with large data set 910.

Policy mining system 108 stores new payroll rule 902 in payroll rules 212. Policy mining system 108 may then link new payroll rule 902 to instance-specific information 414 of policy instance 202.

The illustration of policy framework 100 in FIG. 1 and the different components and examples of implementations in FIGS. 1-9 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 10:
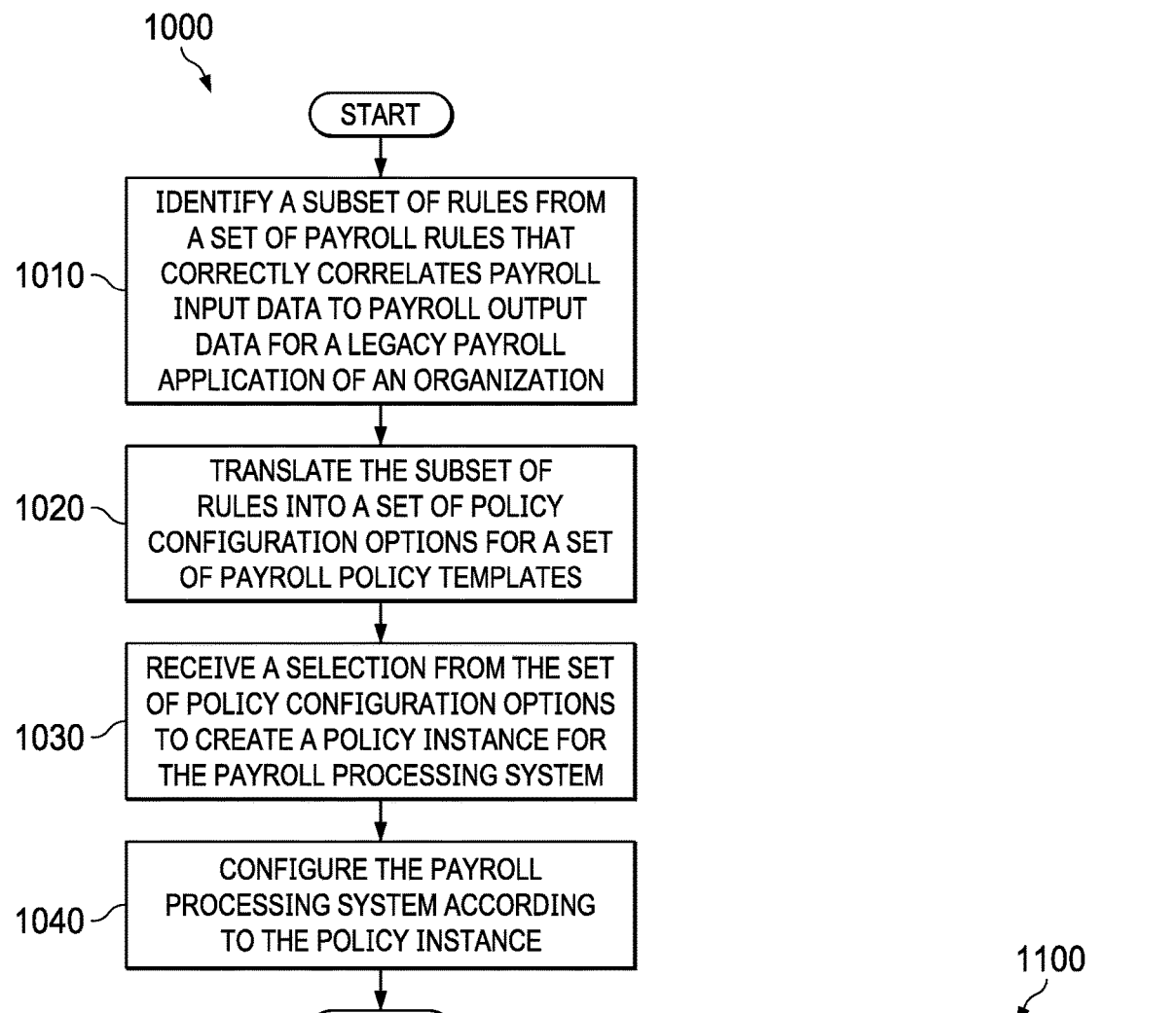
FIG. 10 is an illustration of a flowchart of a process for identifying policy configuration options in accordance with an illustrative embodiment.

Turning next to FIG. 10, an illustration of a flowchart of a process for identifying policy configuration options is depicted in accordance with an illustrative embodiment. The process in FIG. 10 may be implemented in policy miner 228 shown in block form in FIG. 2. For example, these different steps may be implemented using program code.

Process 1000 begins by identifying a subset of rules from a set of payroll rules that correctly correlates payroll input data to payroll output data for a legacy payroll application of an organization (step 1010). The subset of payroll rules can be subset of rules 236 of payroll rules 212 in FIG. 2. Payroll input data and payroll output data can be payroll input data 220 and payroll output data 222, respectively, for legacy payroll system 214 of FIG. 2.

Process 1000 translates the subset of rules into a set of policy configuration options for a set of payroll policy templates (step 1020). The set of policy configuration options can be policy configuration options 230 of FIG. 2.

Process 1000 receives a selection from the set policy configuration options to create a policy instance for the payroll processing system (step 1030). The selection can be made automatically by policy miner 228, or can be made by an operator interacting with a policy mining system through a user interface, such as user interface 126 in FIG. 1.

Process 1000 configures the payroll processing system according to the policy instance (step 1040), with the process terminating thereafter.

Figure 11:
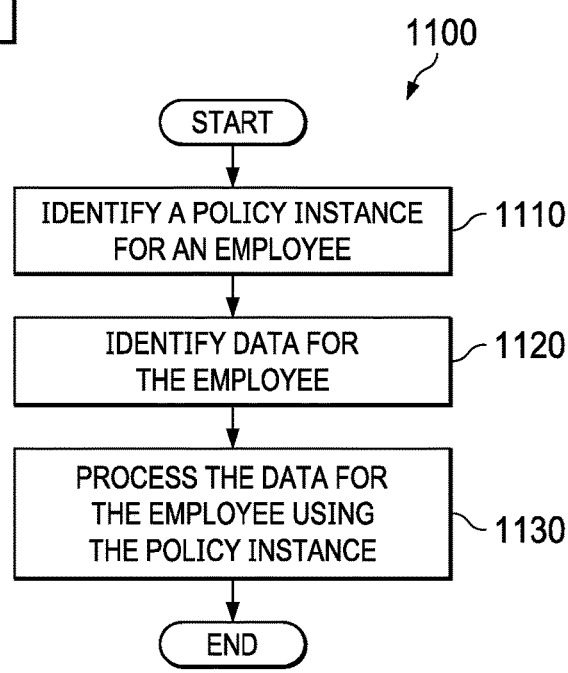
FIG. 11 is an illustration of a flowchart of a process for running a payroll in accordance with an illustrative embodiment.

Turning next to FIG. 11, an illustration of a flowchart of a process for running a payroll is depicted in accordance with an illustrative embodiment. The process in FIG. 11 may be implemented in payroll processing system 110 shown in block form in FIG. 1. For example, these different steps may be implemented using program code.

The process begins by identifying a policy instance for an employee (step 1110). In the illustrative example, more than one policy instance may be present for processing. In that case, step 1110 identifies the policy instance has not yet been processed. As depicted, the policy instance implements a policy when running a payroll.

As depicted, step 1110 may be performed by selecting the employee and then locating the policy instance. In other illustrative examples, the policy instance may be selected for processing and then the employee may be identified as eligible for processing using the policy instance.

The process identifies data for the employee (step 1120). The data for the employee is processed using the policy instance (step 1130), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
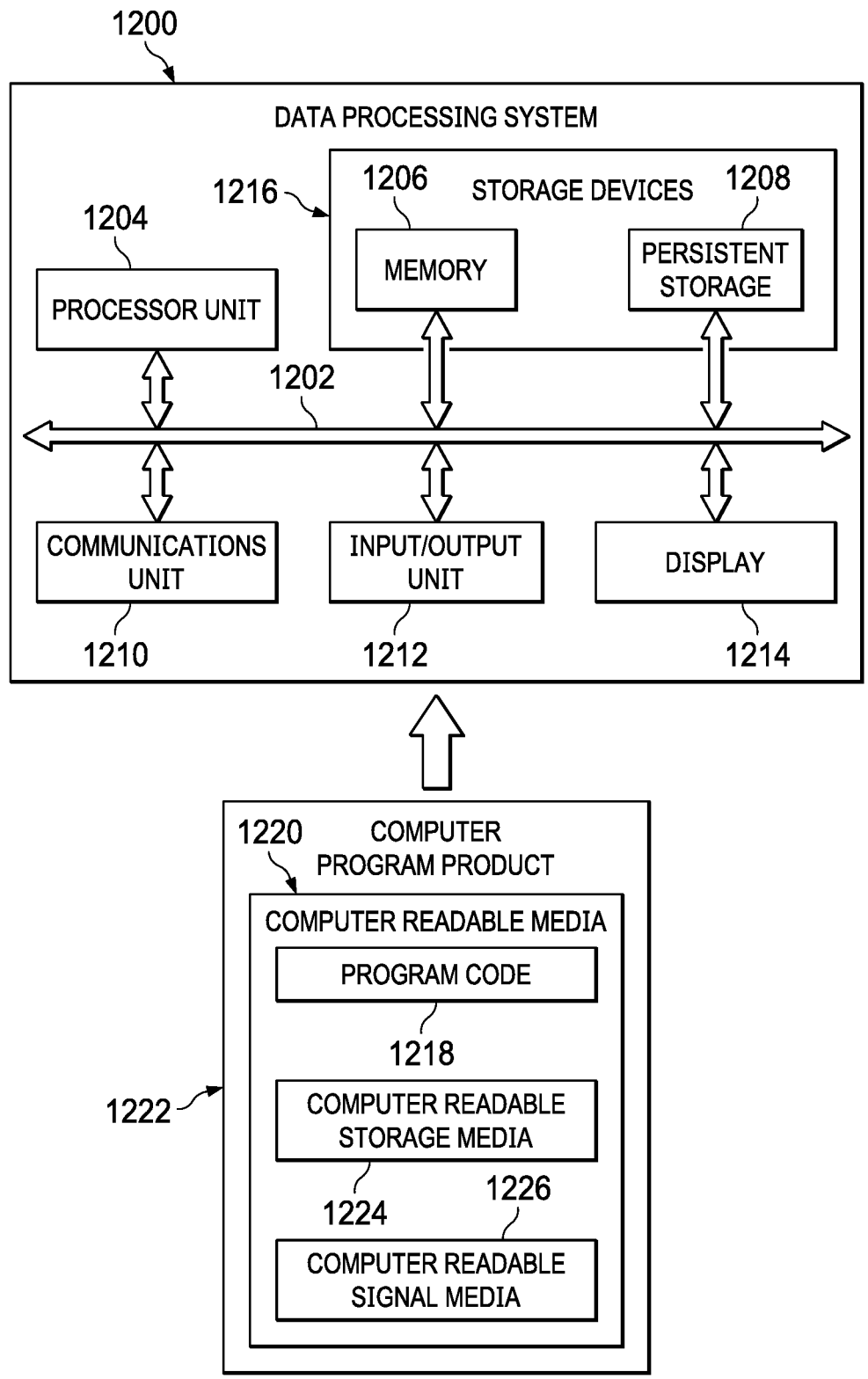
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement policy mining system 108, payroll processing system 110, computer system 232, and other data processing systems that may be used in policy framework 100 in FIG. 1 or information environment 200 in FIG. 2. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer readable storage devices in these illustrative examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a solid state hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these illustrative examples. In one example, computer readable media 1220 may be computer readable storage media 1224 or computer readable signal media 1226.

In these illustrative examples, computer readable storage media 1224 is a physical or tangible storage device used to store program code 1218 rather than a medium that propagates or transmits program code 1218.

Alternatively, program code 1218 may be transferred to data processing system 1200 using computer readable signal media 1226. Computer readable signal media 1226 may be, for example, a propagated data signal containing program code 1218. For example, computer readable signal media 1226 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

Thus, one or more of the illustrative examples provide a method and apparatus to overcome the complexities and time needed to configure a payroll processing system to process payroll for an organization. One or more illustrative examples provide a technical solution that involves identifying policy configuration options from legacy payroll system data that can be instantiated as policy instances to implement policies when running the payroll for the organization. The use of policy configuration options identified in this manner reduces the amount of time needed to implement the policies when configuring a payroll system.

The implementation of the policies using the policy templates provides an ability to implement the policies when configuring a payroll system for the organization more easily as compared to current systems. For example, the different policies of different organizations can be captured and translated into policy configuration options based on existing data from the legacy payroll system. Thus, the use of policy templates and policy configuration options identified from legacy payroll systems allows a way to capture the business concepts from a legacy payroll system and to translate the associated requirements for implementing those business concepts directly to the policy based payroll processing system. Current payroll systems often require a consultant working with people in the organization to meticulously identify the policies relating to the payroll and implement those policies in one or more information systems by writing code, setting parameters, or performing other operations in the information system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for configuring a first payroll processing system, the method comprising:
  using a number of processors to perform the steps of:
    capturing input data to a second payroll processing system and output data from the second payroll processing system;
    deriving based on the input data and the output data captured from the second payroll processing system, policy configuration options for the first payroll processing system;
    identifying a subset of rules from rules associated with operations in templates for the first payroll processing system correctly correlating the input data to the second payroll processing system to the output data from the second payroll processing system via determining a derivation path comprising the subset of rules in an ordered sequence producing an output equal to the output data from the second payroll processing system from the input data to the second payroll processing system;

translating the subset of rules into the policy configuration options and linking the derivation path to a policy configuration in the policy configuration options;

receiving a selection from the policy configuration options; creating a policy instance for the first payroll processing system; and configuring the first payroll processing system according to the policy instance.

2. The method of claim 1, wherein identifying the subset of rules that correctly correlates the input data to the second payroll processing system to the output data from the second payroll processing system further comprises at least one of:

identifying a first group of rules that correctly correlates the input data to the second payroll processing system to the output data from the second payroll processing system by direct matching of data attributes of the input data to the second payroll processing system to data attributes of the output data from the second payroll processing system; and identifying a second group of rules that correctly correlates the input data to the second payroll processing system to the output data from the second payroll processing system by indirect matching of the data attributes of the input data to the second payroll processing system to the data attributes of the output data from the second payroll processing system.

3. The method of claim 2, wherein identifying the second group of rules further comprises identifying a plurality of rules from the rules associated with operations in templates for the first payroll processing system, wherein the plurality of rules correctly correlates the input data from the second payroll processing system comprising an identifier attribute to the output data from the second payroll processing system matching the identifier attribute when the plurality of rules is sequentially applied according to the derivation path.

4. The method of claim 2, further comprising:

a group of policy templates is a group of requirements and practices which are representative of practices further comprising applying a group of filters to the group of policy templates to identify a subset of policy templates that are applicable to the second payroll processing system, wherein the group of filters comprise: a country filter, an industry filter, or a location filter.

5. The method of claim 1 further comprising:

determining a policy variability for the second payroll processing system based on the policy configuration options;

identifying a group of policy eligibility rules from the input data and the output data, wherein policy eligibility rules define at least one of inclusion criteria and exclusion criteria for applying the policy configuration options within the policy instance; and linking the group of policy eligibility rules to the policy configuration options of the policy instance.

6. The method of claim 1, further comprising:

auditing practices of an organization based on the policy configuration options, wherein auditing the practices of the organization comprise at least one of:

analyzing the policy configuration options to determine possibly incorrect practices of the organization; and analyzing the policy configuration options to determine antiquated practices of the organization.

7. The method of claim 1, further comprising:

generating a new rule when none of the rules associated with operations in templates for the first payroll processing system correctly correlates the input data to the output data for the second payroll processing system, wherein generating the new rule comprises at least one of:

generating the new rule according to a supervised learning process; and generating the new rule according to an unsupervised learning process.

8. The method of claim 7, wherein the supervised learning process further comprises:

generating a proposed rule that correctly correlates the input data to the output data for the second payroll processing system;

receiving a validation of the proposed rule; and responsive to receiving the validation of the proposed rule, storing the proposed rule as the new rule in the rules associated with operations in templates for the first payroll processing system.

9. The method of claim 7, wherein the unsupervised learning process further comprises:

statistically correlating the input data to the output data over a data group to generate the new rule, wherein statistically correlating the input data to the output data includes resolving usage ambiguities for the subset of rules based on a statistical correlation; and storing the new rule in the rules associated with operations in templates for the first payroll processing system.

10. The method of claim 1, wherein receiving the selection and configuring the first payroll processing system further comprises:

automatically selecting from the policy configuration options to create the policy instance for the first payroll processing system; and automatically configuring the first payroll processing system according to the policy instance; and wherein automatically selecting from the policy configuration options and automatically configuring the first payroll processing system accelerates the configuring of the first payroll processing system.

11. The method of claim 1 further comprising:

generating paychecks using the first payroll processing system, wherein the first payroll processing system is configured according to the policy instance.

12. A computer system for configuring a first payroll processing system, the computer system comprising:

a storage device configured to store program instructions; and one or more processors operably connected to the storage device and configured to execute the program instructions to cause the computer to:

capture input data to a second payroll processing system and output data from the second payroll processing system;

derive, based upon the input data to the second payroll processing system and the output data from the second payroll processing system, policy configuration options for the first payroll processing system;

identify a subset of rules, from rules associated with operations in templates for the first payroll processing system, that correctly correlate the input data to the second payroll processing system to the output data from the second payroll processing system based upon a determination of a derivation path that comprises the subset of rules in an ordered sequence that produces an output equal to the output data from the second payroll processing system from the input data to the second payroll processing system;

translate the subset of rules into the policy configuration options;

link the derivation path to a policy configuration in the policy configuration options;

create, based upon a reception of a selection from the policy configuration options, a policy instance for the first payroll processing system; and configure the first payroll processing system according to the policy instance.

13. The computer system of claim 12, further executing instructions to:

identify a first group of rules that correctly correlates the input data to the second payroll processing system to the output data from the second payroll processing system by direct matching of data attributes of the input data to the second payroll processing system to data attributes of the output data from the second payroll processing system; and identify a second group of rules that correctly correlates the input data to the second payroll processing system to the output data from the second payroll processing system by indirect matching of the data attributes of the input data to the second payroll processing system to the data attributes of the output data from the second payroll processing system.

14. The computer system of claim 13, further executing instructions to correctly correlate the input data to the second payroll processing system that comprises an identifier attribute to the output data from the second payroll processing system that matches the identifier attribute when the plurality of rules is sequentially applied according to the derivation path.

15. The computer system of claim 13, further executing instructions to perform at least one of: configure, or run, the policy instance in less time than the second payroll processing system requires to configure or run a process that produces a product similar to a product of the policy instance;

create a group of policy templates comprising a group of requirements and practices;

apply a group of filters to the group of policy templates to identify a subset of policy templates that are applicable to an organization; and wherein the group of filters comprise: a country filter, an industry filter, and a location filter.

16. The computer system of claim 12, further executing instructions to:

determine a policy variability based on the policy configuration options;

identify a group of policy eligibility rules from the input data and the output data, wherein policy eligibility rules define at least one of inclusion criteria and exclusion criteria for applying the policy configuration options within the policy instance; and link the group of policy eligibility rules to the policy configuration options within the policy instance.

17. The computer system of claim 12, further executing instructions to audit practices based on the policy configuration options, wherein an audit of the practices comprises a determination of at least one of:

possible incorrect practices by analyzing the policy configuration options; and antiquated business practices at a client by examining the policy configuration options.

18. The computer system of claim 12, further executing instructions to generate a new rule when none of the rules correctly correlates the input data to the output data for the second payroll processing system, wherein a generation of the new rule comprises the generation of at least one of:

a first new rule according to a supervised learning process; and a second new rule according to an unsupervised learning process.

19. The computer system of claim 18, further executing instructions:

generate a proposed rule that correctly correlates the input data to the output data for the second payroll processing system of an organization;

receive a validation of the proposed rule; and responsive to a reception of the validation of the proposed rule, storing the proposed rule as the new rule in the rules.

20. The computer system of claim 18, further executing instructions:

statistically correlate the input data to the output data over a data group;

resolve usage ambiguities in a first group of rules and a second group of rules based on a statistical correlation to generate the new rule; and store the new rule in the rules.

21. The computer system of claim 12, to:

automatically select from the policy configuration options to create the policy instance for the first payroll processing system by selection and configuration of policy options; and automatically accelerate a payroll implementation process.

22. The computer system of claim 12, further comprising the first payroll processing system configured to generate paychecks according to the policy instance.

23. A computer program product for configuring a first payroll processing system, the computer program product comprising:

a non-transitory, computer readable storage medium having program instructions stored thereon to perform the steps of:

capturing input data to a second payroll processing system and output data from the second payroll processing system, and thereafter;

deriving, based upon the input data to the second payroll processing system and the output data from the second payroll processing system, policy configuration options for the first payroll processing system;

identifying a subset of rules, from rules associated with operations in templates for the first payroll processing system, that correctly correlate the input data to the second payroll processing system to the output data from the second payroll processing system based upon a determination of a derivation path that comprises the subset of rules in an ordered sequence that produces an output equal to the output data from the second payroll processing system from the input data to the second payroll processing system;

translating the subset of rules into the policy configuration options and link the derivation path to a policy configuration in the policy configuration options;

receiving a selection of a policy configuration option in the policy configuration options and create a policy instance for the first payroll processing system; and configuring the first payroll processing system according to the policy instance.

24. The computer program product of claim 23, wherein identifying the subset of rules comprises instructions for:

identifying a first group of rules that correctly correlates the input data to the second payroll processing system to the output data from the second payroll processing system by direct matching of data attributes of the input data to the second payroll processing system to data attributes of the output data from the second payroll processing system; and identifying a second group of rules that correctly correlates the input data to the second payroll processing system to the output data from the second payroll processing system by indirect matching of the data attributes of the input data to the second payroll processing system to the data attributes of the output data from the second payroll processing system.

25. The computer program product of claim 24, wherein identifying the second group of rules comprises instructions for:

identifying a plurality of rules from the rules, wherein the plurality of rules correctly correlates the input data to the second payroll processing system that comprises an identifier attribute to the output data from the second payroll processing system that matches the identifier attribute when the plurality of rules is sequentially applied according to the derivation path.

26. The computer program product of claim 24, wherein:

the policy templates comprise a group of requirements and practices;

the instructions further comprise instructions to apply a group of filters to the policy templates to identify a subset of policy templates that are applicable to an organization; and the group of filters include a country filter, an industry filter, and a location filter of the second payroll processing system.

27. The computer program product of claim 23, wherein the instructions further comprise instructions to:

determine a policy variability based on the policy configuration options;

identify a group of policy eligibility rules from the input data to the second payroll processing system and the output data from the second payroll processing system, wherein the group of policy eligibility rules define at least one of inclusion criteria and exclusion criteria for applying the policy configuration options within the policy instance; and link the group of policy eligibility rules to the policy configuration options of the policy instance.

28. The computer program product of claim 23, wherein the instructions further comprise:

instructions to audit payroll practices based on the policy configuration options, such that an audit of the payroll practices comprises at least one of:

instructions to analyze the policy configuration options to determine possibly incorrect payroll practices; and instructions to analyze the policy configuration options to determine antiquated payroll practices.

29. The computer program product of claim 23, wherein the instructions further comprise:

instructions to generate a new rule when none of the rules correctly correlate the input data to the second payroll processing system to the output data from the second payroll processing system, wherein generating the new rule comprises at least one of:

instructions to generate the new rule according to a supervised learning process; and instructions to generate the new rule according to an unsupervised learning process.

30. The computer program product of claim 29, instructions to generate the new rule according to the supervised learning process comprise:

instructions to generate a proposed rule that correctly correlates the input data to the second payroll processing system to the output data from the second payroll processing system; and instructions to store the proposed rule as the new rule in the rules in response to receiving validation of the proposed rule.

31. The computer program product of claim 29, wherein the instructions to generate the new rule according to the unsupervised learning process comprise:

instructions to statistically correlate the input data to the second payroll processing system to the output data from the second payroll processing system over a data group to generate the new rule, wherein statistically correlating the input data to the second payroll processing system to the output data from the second payroll processing system includes a resolution of usage ambiguities for the subset of rules based on a statistical correlation; and instructions to store the new rule in the rules.

32. The computer program product of claim 23, wherein the instructions further comprise:

instructions to automatically select from the policy configuration options to create the policy instance for the first payroll processing system; and instructions to automatically configure the first payroll processing system according to the policy instance, and thereby accelerate configuration of the first payroll processing system.

33. The computer program product of claim 23 further comprising:

instructions in the first payroll processing system configured to generate paychecks, wherein the first payroll processing system is configured according to the policy instance.

* * * * *